United States Patent [19]

Rubino

[11] Patent Number: 4,756,274
[45] Date of Patent: Jul. 12, 1988

[54] OPTICAL MILK FLOW DETECTOR AND VACUUM SHUTOFF FOR MILKER

[75] Inventor: Daniel A. Rubino, Elmhurst, Ill.

[73] Assignee: Babson Bros. Co., Oak Brook, Ill.

[21] Appl. No.: 88,993

[22] Filed: Aug. 21, 1987

Related U.S. Application Data

[63] Continuation of Ser. No. 794,049, Nov. 1, 1985, abandoned.

[51] Int. Cl.⁴ ............................................. A01J 7/00
[52] U.S. Cl. .............................. 119/14.08; 119/14.16
[58] Field of Search .............. 119/14.14, 14.15, 14.08, 119/14.16

[56] References Cited

U.S. PATENT DOCUMENTS

| | | | |
|---|---|---|---|
| 3,115,116 | 12/1963 | Schilling et al. | 119/14.08 |
| 3,690,300 | 9/1972 | Tonelli | 119/14.14 X |
| 3,773,016 | 11/1973 | Needham et al. | 119/14.08 |
| 4,190,020 | 2/1980 | Tamás et al. | 119/14.14 X |
| 4,331,102 | 5/1982 | Olander | 119/14.15 X |
| 4,344,385 | 8/1982 | Swanson et al. | 119/14.08 |
| 4,347,868 | 9/1982 | Scott | 119/14.08 X |
| 4,385,590 | 5/1983 | Mortensen | 119/14.14 X |

FOREIGN PATENT DOCUMENTS

| | | | |
|---|---|---|---|
| 7907656 | 4/1981 | Netherlands | 119/14.14 |
| 935022 | 6/1982 | U.S.S.R. | 119/14.14 |

*Primary Examiner*—Robert P. Swiatek
*Attorney, Agent, or Firm*—Wood, Dalton, Phillips, Mason & Rowe

[57] ABSTRACT

An infrared light sensor outside the milk flow path is connected with an end of milking indicator. The light sensor is connected with a milk flow detector which actuates the indicator giving a visual or audible signal when milk flow ceases. Vacuum is shut off and the milker is retracted. Electrical power for the light source, light sensor and indicator circuit is derived from the milker pulsator signals.

18 Claims, 3 Drawing Sheets

U.S. Patent  Jul. 12, 1988  Sheet 1 of 3  4,756,274
FIG. 1
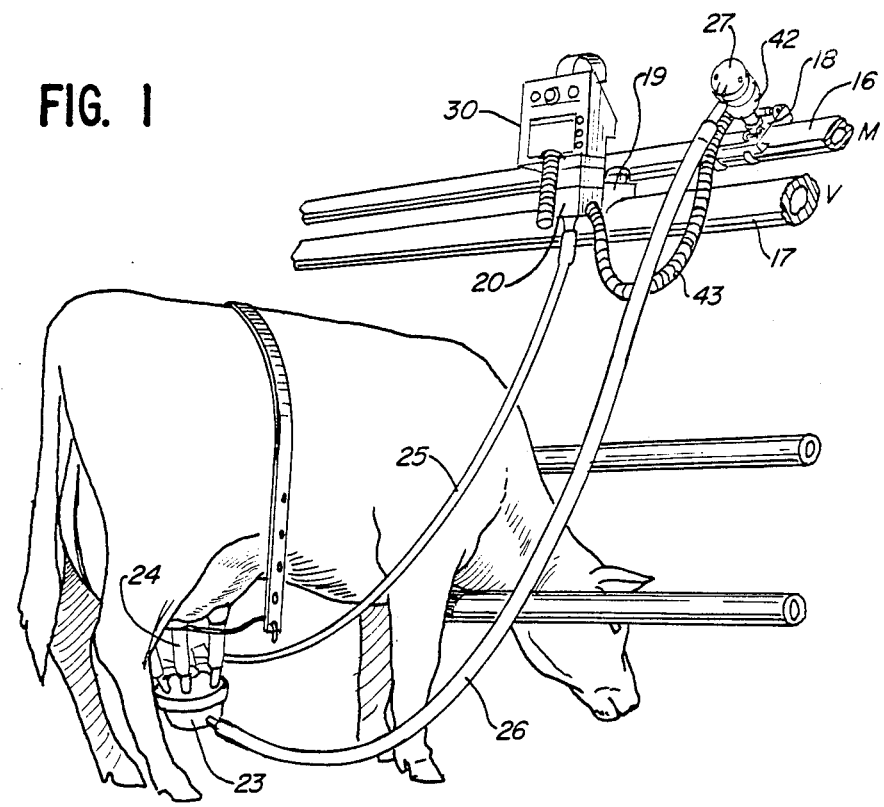
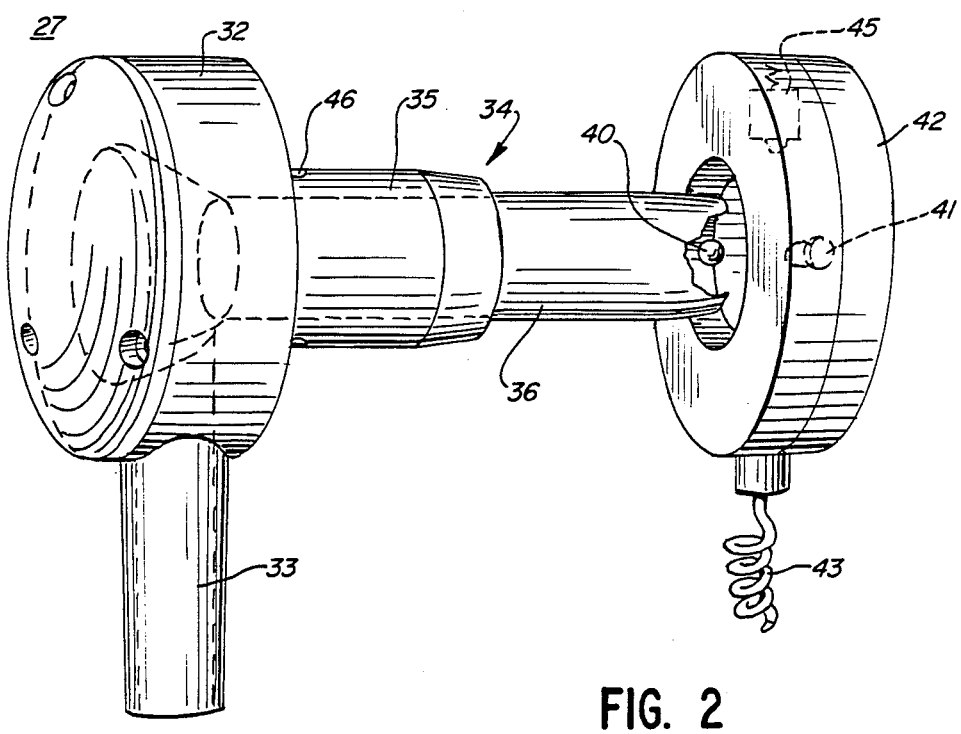
FIG. 2

OPTICAL MILK FLOW DETECTOR AND VACUUM SHUTOFF FOR MILKER

This application is a continuation, of application Ser. No. 794,049, filed Nov. 1, 1985, and now abandoned.

SPECIFICATION

This invention is concerned with an optical milk flow detector and an end of milking indicator for a pipeline milking system.

Commercial milk flow detectors with electrical sensing typically used an electrode or probe which extends into the milk flow path. See, for example, Schilling U.S. Pat. No. 3,115,166, Needham et al. U.S. Pat. No. 3,773,016 or Swanson et al. U.S. Pat. No. 4,344,385. A probe in the milk flow path is undesirable as it may impede milk flow and contributes to cleaning problems.

A principal feature of the invention is a milk flow detector in which a section of the milk flow path between the milker unit and pipeline has an optically translucent wall, the detector comprising a light source outside the milk flow path directing light through the translucent wall which light is blocked by milk in the flow path and a light sensor outside the milk flow path which receives light from the source only in the absence of milk in the flow path. Preferably, light from the source is primarily of infrared wavelengths which are particularly susceptible to absorption by the fat particles in milk. The light sensor is shielded from an ambient light by an opaque cover and is preferably sensitive to radiation impinging only from a limited angle where the source is located.

Another feature of the invention is the provision of a milk flow detector in which the detector is powered from the pulsator signal circuit. Such a detector is particularly suited for use with a stanchion barn pipeline milking system where the pulsator signal circuit is already in place.

A further feature of the invention is that the light source and light sensor are mounted in an opaque ring fitted to the nipple of the connector between the milk hose and the pipeline milk valve.

Yet another feature of the invention is that the milkline connector incorporates a pneumatic vacuum shutoff valve.

Further features and advantages of the invention will readily be apparent from the following specification and from the drawings, in which:

FIG. 1 is a view of a milking system incorporating one embodiment of the invention;

FIG. 2 is a perspective view of the milk hose connector and sensor ring;

Figure 3:
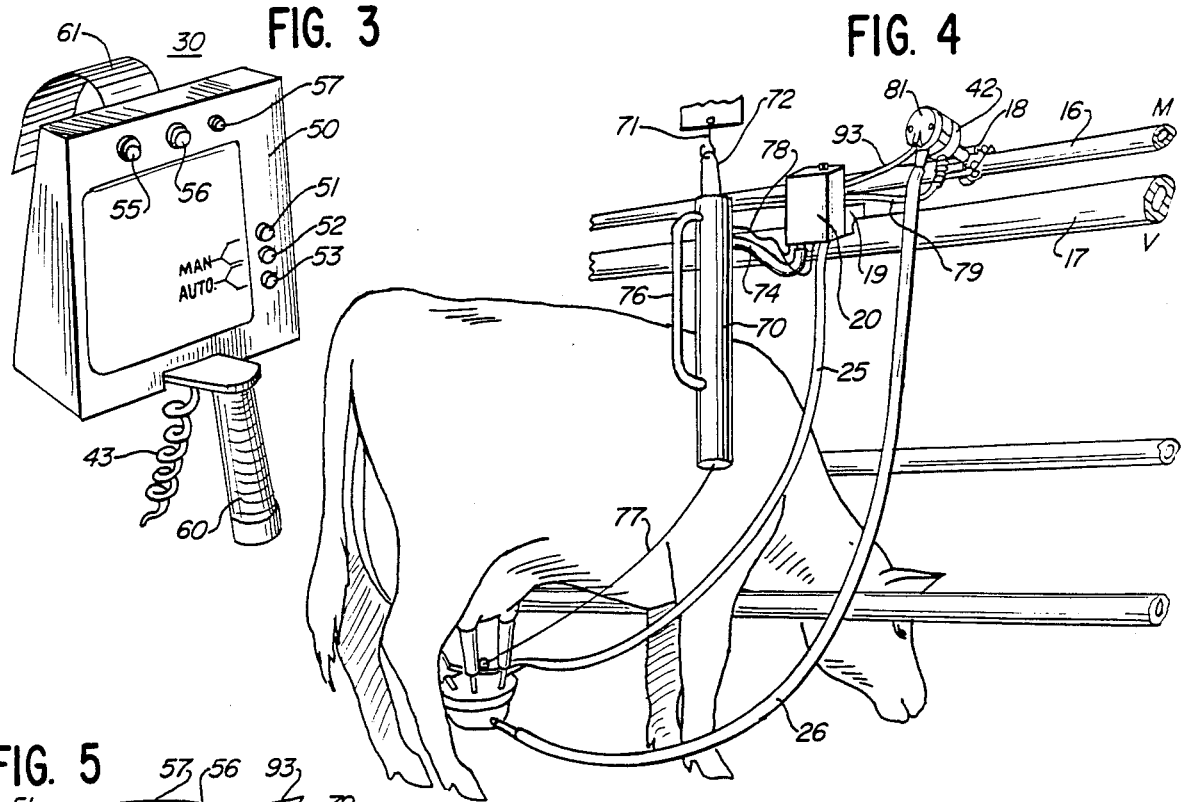
FIG. 3 is a perspective view of the operator's control unit of the system of FIG. 1.

The invention is illustrated in a stanchion barn milker system with a carry-away milk pipeline and it is particularly suited for use with such a milking system. However, some of the features of the milk flow sensor and end of milking indicator, as the optical sensor and milk flow detector circuit, for example, may be used in other milking systems.

In FIG. 1 a cow is shown in a stall of a stanchion barn. Above the cow's head at the front of the stall are an evacuated milk pipeline 16 and a vacuum line 17 to which milker pulsator valves may be connected. The milk line 16 has a milk valve 18 mounted thereon for each pair of stalls. The milk valve may, for example, be of the type shown in Shulick et al. U.S. Pat. No. 3,545,719. Similarly, a stall cock 19 is provided on vacuum line 17 for each pair of stalls. The stall cock may be of the type shown in Panock U.S. Pat. No. 4,366,772, providing both vacuum and electrical pulsator signals for a pulsator valve 20 connected thereto. Milker unit 23 has teat cups 24 attached to the cow. Pulsator 20 is connected through hose 25 with the teat cup shells. A milk hose 26 is connected from the milker 23 through a sensor elbow 27 with the milk line valve 18. The milk line 16 is typically connected with a bulk storage tank, not shown.

An operator control unit 30 is mounted on the pulsator valve 20. The control unit includes a power supply and control circuit which will be described below. The circuit is powered from the pulsator signal which is available at stall cock 19. It is not necessary that a separate electrical power circuit be installed in the barn in order to utilize the end of milking indicator.

Milk hose 26 and sensor elbow (or valve connector) 27 form a milk flow path from the milker 23 to pipeline 16. Elbow 27, FIG. 2, has a plastic body 32 with a nipple 33 to which the milk hose 26 is connected. A second nipple 34 extends at right angles to the nipple 33 and includes a plastic hub 35 which receives a tubular stainless steel shank 36 for insertion into milk valve 18.

An LED light source 40 and a phototransistor light sensor 41 are mounted in diametrically opposed relation in a ring 42 which fits over plastic hub 35. The plastic material of connector 27 is translucent (or transparent). Light from source 40 is directed through the plastic wall of hub 35 and the milk flow path within the hub to the light sensor 42. The LED 40 and phototransistor 41 are connected with control unit 30 through cable 43.

Milk valve 18 is typically located on milk pipeline 16 in the upper quadrant at an angle of 30° to 45° from the horizontal. The weight of milk hose 26 orients the connector 27 so that nipple 33 extends downwardly. Ring 42 is provided with a spring detent 45. The detent is received in a recess 46 at the top of hub 35 so that the diameter of the ring between light source 40 and light sensor 41 is generally horizontal and the light beam is projected across the center of the milk flow path through the hub. When the flowing milk fills more than half of the connector flow path, the light beam is blocked.

The operator control unit is provided with indicators, as lights, which are actuated to show whether the milker is operating automatically or manually, whether milk is flowing and to attract the attention of the operator when the cow has milked out. The milk flow is often intermittent and the milk flow detector circuit includes a time delay, as will appear. An audible indicator may be used rather than or in addition to a visual indicator, particularly for the end of milking indicator.

Light source 40 is preferably an infrared source and light sensor 41 is more sensitive to infrared light than to shorter wavelengths. The milk flow sensor is thus relatively insensitive to ambient natural and artificial light, both of which have little infrared content.

The operator control unit 30, FIG. 3, has a front panel 50 with buttons 51, 52 and 53 which are touched by the operator to select automatic or manual operation of the control circuit. Indicator lights 55, 56 and 57 provide a visual indication of the system conditions. White light 55 shows that milk is flowing. Red light 56, together with an audible alarm to be discussed below, is energized when milking is ended. Small red light 57 shows that the system is set for manual rather than automatic operation.

In use, the pulsator 20 is plugged into a stall cock 19. Upon power up the control circuit will be set for automatic operation. The milker unit 23 is attached to the cow. So long as milk continues to flow at greater than a selected rate, the white indicator light 55 will be lit. When the milk flow drops below a rate sufficient to block the infrared light beam from source 40 to the sensor 41 and the selected time delay has expired, the white milk light 55 is extinguished and red end of milking light 56 is lit providing a visual indication to the operator that the cow has milked out. The milker is removed from the cow and attached to the adjacent cow which shares the milk valve 18 and stall cock 19. The control circuit is reset for automatic operation by the operator touching buttons 52, 53. The procedure is then repeated.

In the event the operator wishes to milk a cow without the end of milking indication, buttons 51, 52 are touched. Manual light 57 is lit and the end of milking light 56 will not operate.

After the second cow is milked out, pulsator 20 and milk hose connector 27 are removed from stall cock 19 and milk valve 18 and the entire apparatus is moved to the next milking position. Control unit 30 is provided with a handle 60 depending from the panel 50 to facilitate insertion and removal of the pulsator 20 from stall cock 19 and movement of unit from position to position. A hook 61 may be used to hang the control unit from a pipe or other support.

Figure 4:
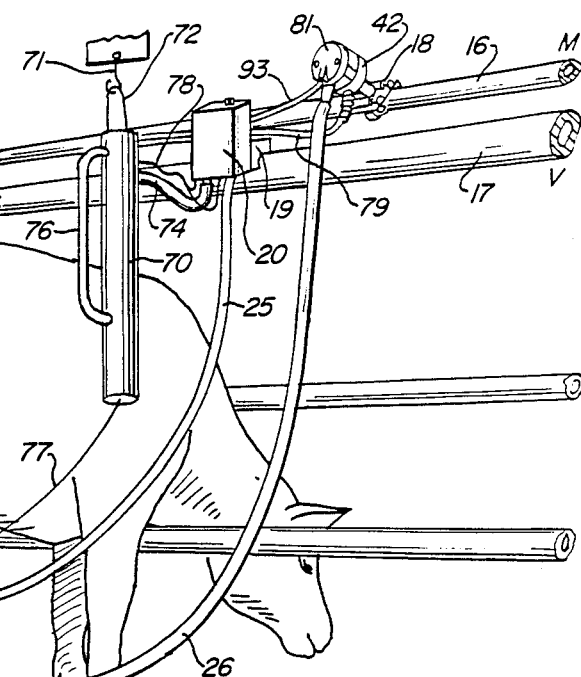
FIG. 4 is a view similar to FIG. 1 of another embodiment of the invention with automatic shut off and milker retraction.
Figure 5:
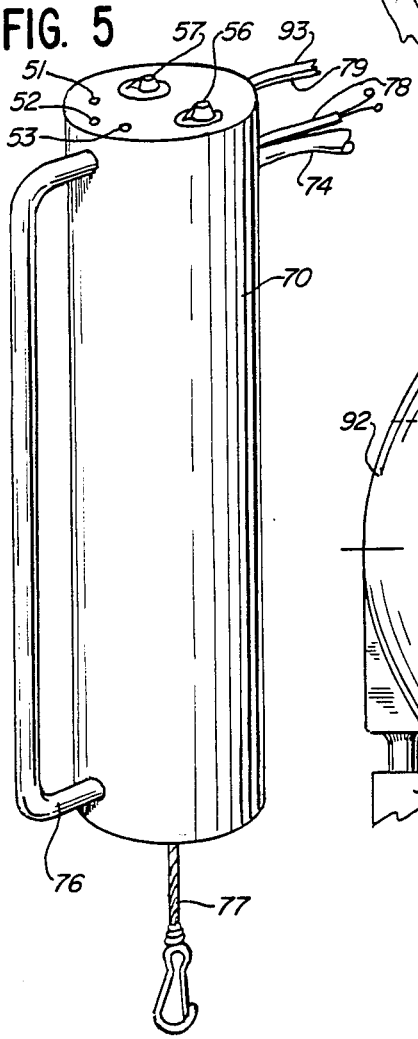
FIG. 5 is an enlarged fragmentary view of a portion of the retraction cylinder of FIG. 4 together with the stall cock and pulsator valve.
Figure 6:
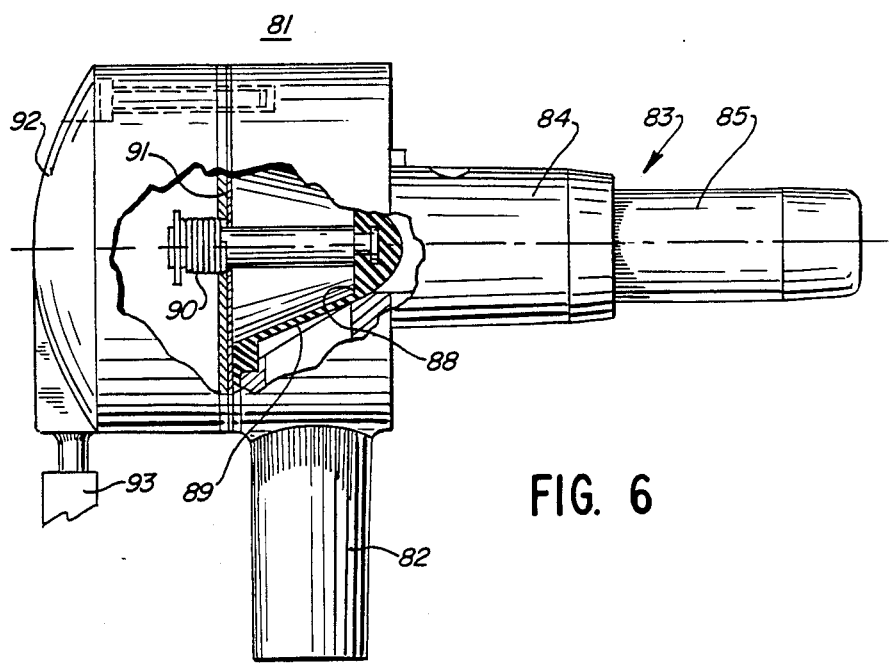
FIG. 6 is an elevation, partially in section, of the milk hose connector and shutoff valve of FIG. 4.

A modified milking system with automatic end of milking shutoff and milker retraction is illustrated in FIGS. 4, 5 and 6. The milker and optical sensing system are the same as in FIGS. 1 and 2 and the same reference numerals will be used to indicate common elements. Only those features of the system which are different will be described in detail.

A pneumatic retraction cylinder 70 is suspended from overhead hook 71 by a bail 72. The cylinder is connected with vacuum at the pulsator valve 20 by a hose 74. Electrical cable 75 is connected with the pulsator electrical circuit. A handle 76 on cylinder 70 facilitates movement of the apparatus between milking positions. Pulsator valve 20 is plugged into stall cock 19 as in FIG. 1 and is connected through hose 25 with the shells of teat cups 24. A cord 77 from a piston in retraction cylinder 70 is connected with milker 23. The electrical power supply and the control circuit are mounted on a circuit board located within the upper portion of cylinder 70 and is connected with the pulsator signal circuit through cable 78.

The milk hose connector 81 differs from connector 27 of FIG. 2 in that it includes a pneumatically actuated vacuum shutoff valve, as will appear. Flow sensor ring 42 is, however, mounted on the connector as in FIGS. 1 and 2 and is connected with the control circuit in cylinder 70 by cable 79. The Manual/Automatic buttons 51, 52 and 53 are mounted on top of cylinder 70 and can be actuated by the thumb or forefinger of the operator. Indicator lights 56 (end of milking or retract) and 57 (manual) are also located on top of cylinder 70.

Connector elbow 81, FIG. 6, has a nipple 82 to which milk line 26 is connected. A second nipple 83 has a plastic hub 84 and stainless steel connector shank 85. Ring 42 with the light source and sensor are mounted on hub 84 as in FIG. 2. The milk flow path through the connector 81 has a valve seat 88 for a resilient, penumatically operated valve 89. A spring 90 between the valve 89 and the plate 91 holds the valve in open position. When the valve is subjected to vacuum in the milk flow path from milk pipeline 16, it closes on seat 88. A cover 92 over the valve forms a pneumatic control chamber and is connected through hose 93 with retraction cylinder 70. When hose 93 is connected with vacuum, the combined effect of the vacuum and spring 90 opens the shutoff valve 89 for milking.

During the milking operation cord 77 is extended and shutoff valve 89 is open. When the rate of milk flow drops and end of milking is indicated, the vacuum connection in cylinder 70 to hose 93 is broken and valve 89 closes. This shuts off vacuum to the milker 23 so that the teat cups 24 will drop from the cow 15. At the same time, a piston within cylinder 70 is retracted lifting the milker 23 on cord 77.

The operator will bridge Automatic contact buttons 52,53 to release the piston in the cylinder 70 and reconnect vacuum with hose 93, opening shutoff valve 89. The operator pulls the cord 77 out of cylinder 70 and attaches the milker to the next cow.

Figure 7:
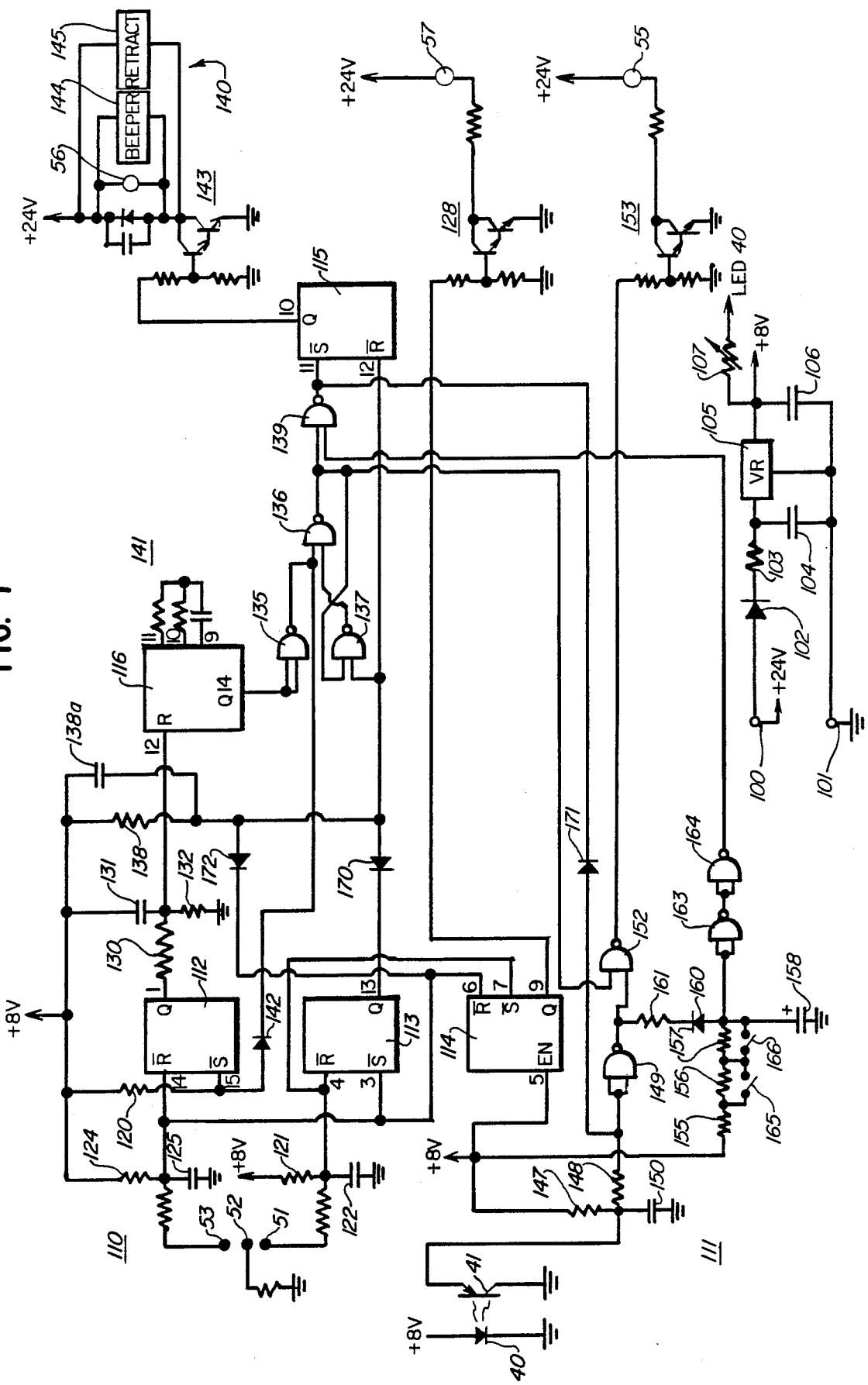
FIG. 7 is a schematic diagram of the power supply and control circuit.

A schematic diagram of the power supply and control circuit is shown in FIG. 7. The diagram represents an operative embodiment of a circuit for detecting milk flow and indicating the end of milking. In the description of the circuit some of the elements will be identified with specific component designations and values. It will be understood that these specific parts are not essential to the invention unless required by the claims. Some of the circuit elements, as voltage dividers, and coupling or decoupling components which are shown in the diagram will not be identified as their purpose is apparent and a description is not necessary to an understanding of the functioning of the circuit.

The power supply has terminals 100, 101 connected with the pulsator circuit which supplies a 24 volt square wave with 50-60 pulses per minute. Terminal 101 is grounded. The pulses are rectified by diode 102 and connected through resistor 103 with flter capacitor 104. A voltage regulator 105 has an 8 volt output used to power the various circuits, as shown. Capacitor 106 provides decoupling and may in practice be several capacitors for the various circuit components. LED 40 is connected with the 8 volt supply through a light intensity potentiometer 107.

The control circuit includes an Automatic/Manual mode circuit 110 and a milk flow detector circuit 111. The principal circuit elements are NAND logic flip-flops 112, 113, 114 and 115 (type 4044), a timer 116 (type 4060) and several two input NAND gates which will be identified below.

When the power supply is connected with the pulsator signal circuit an 8 volt DC operating potential is applied to the control circuit. RC time delays establish initial operation in the Automatic mode as will appear from the following discussion. The 8 volt potential applied to terminal 5 of flip-flop 114 enables each of the four flip-flop circuits. An immediate high potential is applied to $\bar{S}$ terminal 15, flip-flop 112, through resistor 120. Resistor 121, 3.9 megohms, and capacitor 122, 0.0047 µf, delay the application of a high potential to the $\bar{R}$ terminal 4 of flip-flop 113. A second time delay circuit, resistor 124, 3.9 megohms, and capacitor 125, 0.047 µf, has a greater delay time and applies high potentials to the $\bar{R}$ input terminal 14 of flip-flop 112 and to $\bar{S}$ input, terminal 3, flip-flop 113. This sequence of inputs results in flip-flop 112 being reset with Q, terminal 1, low, and flip-flop 113 being set with Q, terminal 13, high. Flip-flop 114 has input $\bar{S}$, terminal 7, connected with the shorter time constant capacitor 122 and input $\bar{R}$, terminal 6, connected with the longer time constant capacitor 125. Q, terminal 9, is low and the switch 128 for Manual light 57 is open.

The Q output of flip-flop 112 is connected through resistor 130, 100,000 ohms, with the junction between capacitor 131, 1 µf, and resistor 132, 1 megohm, and the junction is connected with the reset terminal 12 of timer 116. Upon connection with the pulsator circuit, capacitor 131 has no charge and the 8 volt supply voltage appears across resistor 132, resetting timer 116. The Q output of flip-flop 112 is low, as described above, and the voltage at the timer reset terminal drops to ground as capacitor 131 charges. The timer output at Q, terminal 14, is initially low. This signal is applied to both inputs of NAND 135 which has a high output connected with one of the inputs of NAND 136. NANDs 136 and 137 are cross coupled in a flip-flop circuit. The output of NAND 136 is initially low and this signal is connected with one input of NAND 137. The other input of NAND 137 is connected through resistor 138, 3.9 megohms, with the 8 volt supply. Shunt capacitor 138a suppresses noise. The high output of NAND 137 is connected with the second input of NAND 136, maintaining the low output therefrom. NAND 139 has one input connected with the output of NAND 136 and its output is high regardless of the condition of the other input which is connected with the milk flow detector circuit 11. The high output of NAND 139 is connected with $\bar{S}$ input terminal 11 of flip-flop 115. The $\bar{R}$ input terminal 12 of flip-flop 115 is connected with 8 volt supply through a resistor 138. The initial condition of the output Q, terminal 10, is low and the end of milking indicator circuit 140 is disabled.

Timer 116 operates at a frequency determined by the RC circuit 141. After approximately 60 seconds, timer output Q, terminal 14, goes high. The output of NAND 135 goes low, the output of NAND 136 goes high. This activates the end of milking indicator circuit. If milk is flowing from the cow, the signal to NAND 139 from milk flow detector circuit 111 is low and the output of NAND 139 remains high. When the output of NAND 135 goes low, the $\bar{S}$ input of flip-flop 112 goes low through diode 142. The output Q goes high and discharges capacitor 131. When the cow is milked out, the signal from the milk flow circuit 111 goes high, the output of NAND 139 goes low at the $\bar{S}$ input of flip-flop 115 and Q goes high closing switch 143 to turn on end of milking light 56, energize beeper 144 and actuate the retraction mechanism 145.

In the milk flow detector circuit, phototransistor 41 is connected with the 8 volt supply through resistor 147, 2.2 megohms, and through coupling resistor 148, 10,000 ohms, with the inputs of NAND 149. Capacitor 150, 0.01 µf, is connected from the junction of resistors 147, 148 to ground. When milk flows, transistor 41 does not conduct. The inputs of NAND 149 are high and its output is low. The output of NAND 152 is high, switch 153 conducts and milk light 55 is lit.

An end of milking timing circuit includes resistors 155, 200,000 ohms, 156, 100,000 ohms, and 157, 51,000 ohms, and capacitor 158, 10 microfarads, connected across the 8 volt supply to ground. The junction of resistor 157 and capacitor 148 is connected through diode 160 and resistor 161, 100 ohms, with the output of NAND 149. So long as milk flows, the output of NAND 149 is low and capacitor 158 does not charge. The inputs of NAND 163 are connected with capacitor 158 and its output is high. The output of NAND 164 is low and is connected with an input of NAND 139. When milk flow ceases, light from LED 40 reaches phototransistor 42 causing it to conduct. The inputs of NAND 149 go low and its output goes high. This backbiases diode 160 allowing capacitor 158 to charge. Switches 165, 166 determine the resistance in the charging circuit and provide a charging time from 2 to 3.5 seconds. If milk flow ceases for the selected time, the inputs of NAND 163 go high, its output goes low and the output of NAND 164 goes high. This causes the output of NAND 139 to go low, triggering flip-flop 115 so that Q goes high and turns on end of milking switch 143. Diode 171 clamps the input of NAND 149 low to inhibit flashing of milk light 55 in the event a splash of milk breaks the light beam after the output of NAND 139 goes low at the end of milking.

Before attaching the milker 23 to the next cow, the operator resets the control circuit by touching buttons 52, 53. The output of flip-flop 112 goes low and timer 116 is reset.

Often the cessation of milk flow is temporary. If flow resumes before the end of milking circuit has timed out, transistor 41 is cut off, the inputs of NAND 149 go high and its output goes low, discharging the partially charged capacitor 158.

If the operator wishes to milk a cow without use of the end of milking indicator, touching the buttons 51, 52 drops the potential at the $\bar{R}$ input of flip-flop 113 causing Q to go low. The $\bar{R}$ input of flip-flop 115 is connected with Q through diode 170 and goes low and the output of flip-flop 115 remains low regardless of milk flow. This deactivates the end of milking indicator circuit 140. The $\bar{S}$ input of flip-flop 114 also goes low causing the output Q, terminal 9, to go high turning on switch 128 and lighting the Manual light 57.

When the operator wishes to return to Automatic operation, buttons 52, 53 are touched, dropping the potential at $\bar{S}$ input of flip-flop 113 causing the output Q to go high. A momentary low input is coupled to NAND 137 through diode 172. The NAND output goes high and the output of NAND 136 low. The output of NAND 139 and the $\bar{S}$ input of flip-flop 115 go high. The $\bar{R}$ input of flip-flop 115 returns to the high state activating the indicator circuit and, when milk flow ceases, the output Q will go high.

When the control unit is disconnected from the pulsator supply, moved to another location and reconnected, the circuits reset in the Automatic mode as described above.

I claim:

1. A milking system for a stanchion barn with an evacuated milk pipeline having a milk valve, a pulsator vacuum line having a stall cock with electrical pulsator signals, a milker unit with a milk hose for connection with said milk valve and a pulsator for connection with the vacuum line and electrical pulsator signals, an end of milking indicator, comprising:

an electrically operated optical milk flow sensor connected with said milk hose to sense milk flow therethrough;

a power supply connected with said source of electrical pulsator signals to derive power from the pulsator signals and connected with said sensor to supply power thereto; and a conrol circuit connected with said sensor to derive a milk flow signal therefrom and including means responsive to the milk flow signal for indicating the end of milking.

2. The end of milking detector of claim 1 in which said power supply and control circuit are mounted on the pulsator which plugs into said stall cock.

3. The end of milking detector of claim 1 in which the means for indicating the end of milking includes a pneumatic cylinder for retraction of the milker unit at the end of milking, said power supply and control circuit being mounted in said cylinder.

4. In a pipeline milking system having an evacuated milk line with a milk valve, a pulsator vacuum line with a source of electrical pulsator signals, an electrically operated pulsator valve, and a milker unit with a pulsator hose connected with the pulsator valve and a milk hose connected with said milk valve, an end of milking indicator comprising:

an operator control unit having an electrical power connection with the source of pulsator signals;

an optical milk flow detector connected with said control unit and with the milk hose, between the milker unit and the milk valve, to detect milk flow therethrough; and an indicator responsive to said milk flow detector.

5. The end of milking indicator of claim 4 in which the milking system includes a stall cock with an electrical connector for pulsator signals on the pulsator vacuum line, the pulsator valve being separably connected with said stall cock and said control unit being mounted on said pulsator valve.

6. The end of milking indicator of claim 5 with an operator's handle for the control unit and pulsator valve.

7. The end of milking indicator of claim 6 in which said control unit has an upright front panel with operator control switches and the handle depends from the front panel.

8. The end of milking indicator of claim 4 having a connector elbow between the milk hose and the milk valve there being a milk flow path through the elbow defined in part by a translucent wall, said optical milk flow detector including a light source directing light through said translucent wall and a light sensor receiving the light from said source in the absence of milk flow.

9. The end of milking indicator of claim 8 in which said elbow has a first nipple connected with the milk hose and a second nipple connected with the milk valve, said second nipple having a translucent wall; and including an optical sensor ring on said second nipple having said light sensor and light detector mounted in the ring.

10. The end of milking indicator of claim 4 including a milker retraction cylinder connected with said milker unit, the operator control unit being mounted on said cylinder, a vacuum connection from the cylinder to the pulsator valve and an electrical power connection from said control unit to the pulsator valve.

11. The end of milking indicator of claim 10 having an operator handle on said cylinder.

12. In a milking system having an end of milking indicator with means sensing milk flow, an indicator connected with said sensing means to indicate the end of milking when milk flow ceases, and a control circuit having automatic and manual modes of operation selectable by an operator, the improvement comprising:

an activating circuit connected with the indicator and with the control circuit, responsive to the operator's mode of selection activating the indicator in the automatic mode and deactivating the indicator in the manual mode.

13. In a milking system having an end of milking indicator with means sensing milk flow, an indicator connected with said milk flow sensing means to indicate the end of milking in the absence of milk flow, and a control circuit having a timer, the improvement comprising:

an activating circuit connected with the indicator and responsive to the timer of the control circuit; and means for resetting the timer at the start of milking to deactivate the indicator, the activating circuit responding to the timer to activate the indicator after a time delay.

14. In a pipeline milking system having a milker unit and means including a hose providing a milk flow path from the milker unit to an evacuated milk pipeline, a milk flow detector comprising:

a nipple having an optically translucent wall between the hose and the milk pipeline;

a ring mounted around the nipple;

a light source in said ring outside the milk flow path directing light through said translucent wall, the light being blocked by milk in the flow path; and a light sensor in said ring, outside the milk flow path which receives light from said source only in the absence of milk in the flow path.

15. The milk flow detector of claim 14 in which said light source and light sensor are diametrically positioned in said ring.

16. The milk flow detector of claim 14 including means for positioning said ring on said nipple.

17. The milk flow detector of claim 6 in which the positioning means includes a spring biased detent on one of the parts and a recess to receive the detent in the other part.

18. The milk flow detector of claim 14 in which said milk pipeline is substantially horizontal and said nipple enters the pipeline generally at right angles to the pipeline axis, milk flow through the nipple being in at least the lower portion thereof and in which the ring is located on the nipple so that light from said source to said sensor is along a generally horizontal diameter of the nipple.

* * * * *